United States Patent
Öberg

[19]

[11] Patent Number: 5,511,906
[45] Date of Patent: Apr. 30, 1996

[54] ARRANGEMENT FOR A BOOM

[75] Inventor: Per O. Öberg, Nordmaling, Sweden

[73] Assignee: Expandi Systems AB, Nordmaling, Sweden

[21] Appl. No.: 211,121

[22] PCT Filed: Aug. 18, 1992

[86] PCT No.: PCT/SE92/00555

§ 371 Date: Mar. 21, 1994

§ 102(e) Date: Mar. 21, 1994

[87] PCT Pub. No.: WO93/06309

PCT Pub. Date: Apr. 1, 1993

[30] Foreign Application Priority Data

Sep. 25, 1991 [SE] Sweden .................... 9102785

[51] Int. Cl.$^6$ ........................................ E02B 15/04
[52] U.S. Cl. ........................... 405/68; 405/63; 405/66
[58] Field of Search ........................ 405/60, 63, 66, 405/67, 68, 72; 210/242.1, 923

[56] References Cited

U.S. PATENT DOCUMENTS

| | | |
|---|---|---|
| 4,068,478 | 1/1978 | Meyers et al. . |
| 4,295,755 | 10/1981 | Meyers . |
| 4,741,089 | 5/1988 | Öberg . |
| 5,020,940 | 6/1991 | Smith ........................... 405/63 |
| 5,197,821 | 3/1993 | Cain et al. ..................... 405/66 X |

FOREIGN PATENT DOCUMENTS

| | | |
|---|---|---|
| 57-68413 | 4/1982 | Japan . |
| 344088 | 3/1972 | Sweden . |
| 452897 | 12/1987 | Sweden . |
| 1416978 | 12/1975 | United Kingdom . |

Primary Examiner—Dennis L. Taylor
Attorney, Agent, or Firm—Rolf Fasth

[57] ABSTRACT

An arrangement for a boom for confining and collecting escaped oil, or the like, having a tubular casing and a shield part attached thereto. A plurality of spaced dividing walls are disposed within the tubular casing. The tubular casing is movable between a collapsed rest position and an expanded operational position. Expansion devices are attached to the tubular casing and are movable between a folded position and an unfolded position. Biasing members are attached to the expansion devices for urging the expansion devices into the unfolded position so that the tubular casing is moved into the expanded position. A valve is operatively attached to the tubular casing so that air may flow into the tubular casing through the valve when the tubular casing is expanded. An impervious flexible sheet material has a mid-portion and opposite side edges sealingly attached to the inside of the tubular casing so that the bottom end portions of the sheet hang. A chamber is defined between the hanging bottom end portions and the inside wall of the tubular casing. The chamber is open downwardly so that air may fill the chamber when the tubular casing is in the expanded position to provide buoyancy of the boom even when the boom is damaged.

4 Claims, 2 Drawing Sheets

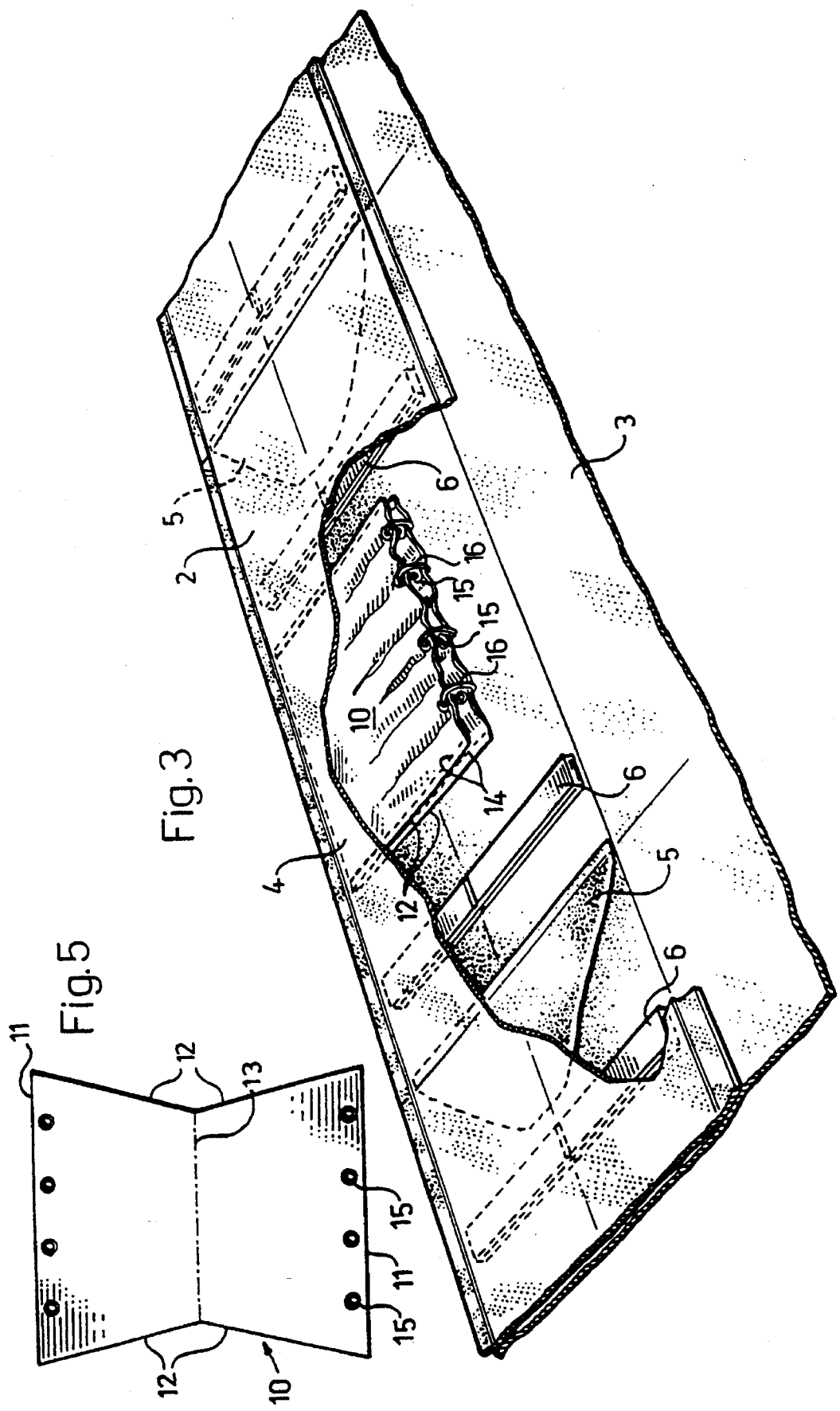

ARRANGEMENT FOR A BOOM

TECHNICAL FIELD

The invention relates in particular to booms of the kind used to contain oil or similar floating materials or substances which have escaped into waterways. Such booms consist as a rule of a floating part and a shield part arranged beneath it.

DESCRIPTION OF THE PRIOR ART

In a previously disclosed boom arrangement, the supporting part consists of a collapsible and extensible and to all intents and purposes hose-like unit made of a soft but durable woven and/or film material, and there is present inside said unit a row of expansion arrangements fitted with spring devices so arranged and tensioned as to attempt to unfold the unit. The hose-like unit is impervious, but is equipped at its uppermost part with valves, through which air is able to flow in and flow out respectively at the time of unfolding and collapsing the unit. Adjacent to the supporting part is the shield part, which is fitted at its lower edge with ballast weights or similar, which contribute to the lateral stabilization of the arrangement as a whole.

OBJECT OF THE INVENTION

It has been found that booms of the previously disclosed kind, irrespective of whether they are subdivided into separate chambers by means of transverse walls, are capable, if they are involved in a collision in conjunction with which the material of the outer casing of the floating part is damaged, of losing so much buoyancy as a result of the inflow of water that they will sink either partially or completely. Apart from the fact that a completely or partially submerged boom is unable to perform its task of containing oil or similar substances, the work of recovery is both difficult and costly. The object of the invention is to make available an arrangement which, as far as possible, will prevent submersion even if the material of the hose-like outer casing is damaged in such a way that its imperviousness is lost.

DESCRIPTION OF THE PRESENT INVENTION

The invention is based largely on existing types of booms and exhibits a similar function in all essential respects. One requirement imposed on the design of the arrangement in accordance with the invention was that booms executed in accordance with the novel arrangement should not differ from the previously disclosed arrangement with regard to their handling and the volume occupied in the rolled-up form.

It follows from this that ideas such as the arrangement of internal buoyancy bodies and similar could be dismissed immediately, since they would have caused the thickness of the rolled-up casing to increase significantly, and with it the external dimensions of the boom rolls, if the same boom length were to be retained.

On the other hand, the desired emergency buoyancy is obtained by the arrangement as proposed here of collapsible pairs of downwardly open air pockets adjacent to the side walls of the casing with appropriate spacing between them along the length of the boom, for example one pair in each section separated by dividing walls, and by the execution of these in such a way that they fill with air automatically at the same time as the boom. Even if the material of the casing becomes torn along part of the section, so that the air leaks out and the buoyancy of the boom section is reduced, the air remaining in the pockets will still provide sufficient buoyancy. The pockets are so dimensioned that one or other of the pockets will provide sufficient buoyancy to prevent total submersion, even if the material of the casing on the opposite side, part of which is also adjacent to the pocket on the same side, were to be torn to pieces.

Distinctive design features which characterize the novel arrangement are that the pair of pockets is formed by weldable pieces of woven or film material, which have parallel end edges but side edges cut essentially into the form of a 'V', in which the part of the material with the smallest width is so arranged as to be welded to that part of the boom casing which forms its back or top, and the angle-cut sides are so arranged as to be welded essentially at right angles to the longitudinal direction of the boom, the consequence of which is that the free edges of the piece of material, which, because of the angled nature of the cutting, are much longer than the distance between the essentially parallel side welds, fold when in the collapsed state and as such do not obstruct the rolling-up of the boom, although they are present at all times as a safety measure.

DESCRIPTION OF THE ILLUSTRATIVE EMBODIMENT

A preferred embodiment of the arrangement in accordance with the invention is described in more detail below with reference to the accompanying drawing, in which.

Figure 1:
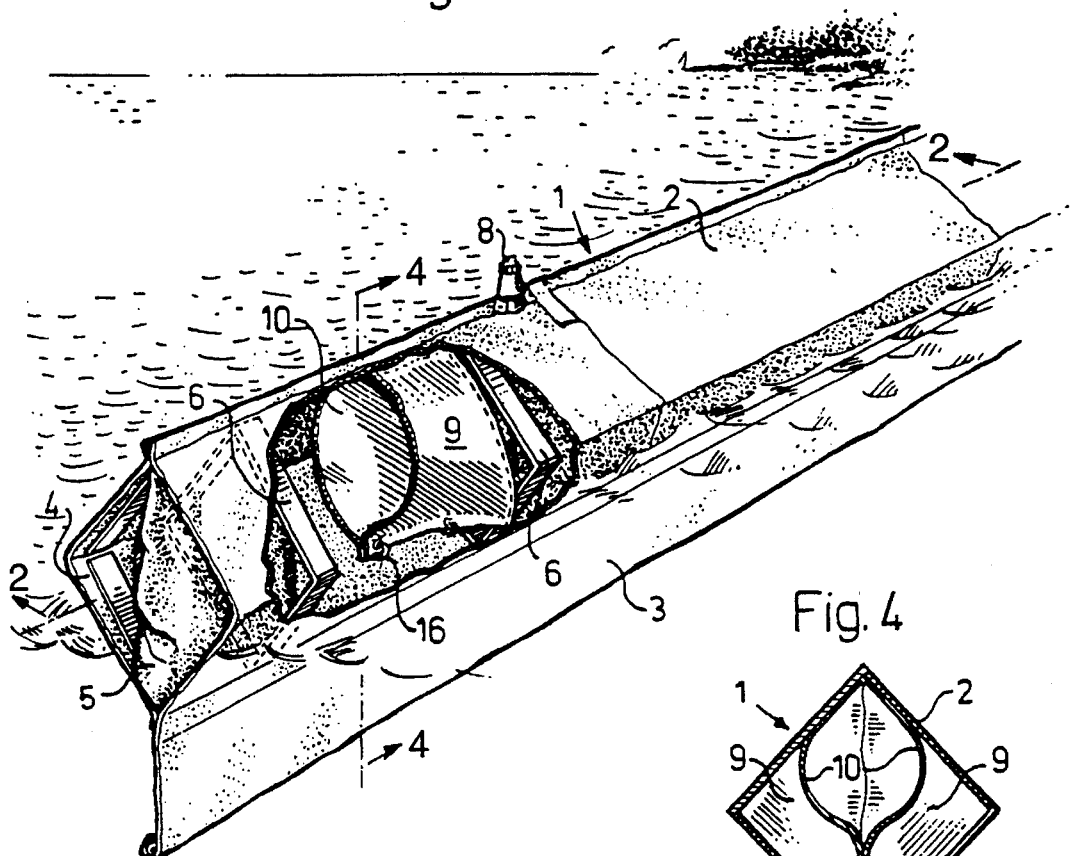
FIG. 1 is a schematic, partially sectioned perspective view of a boom arranged in accordance with the invention in its operating position and with the air pockets in the extended position.
Figure 4:
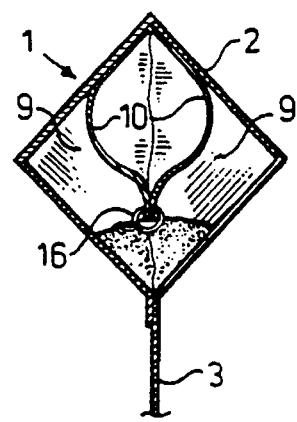
Figure 2:
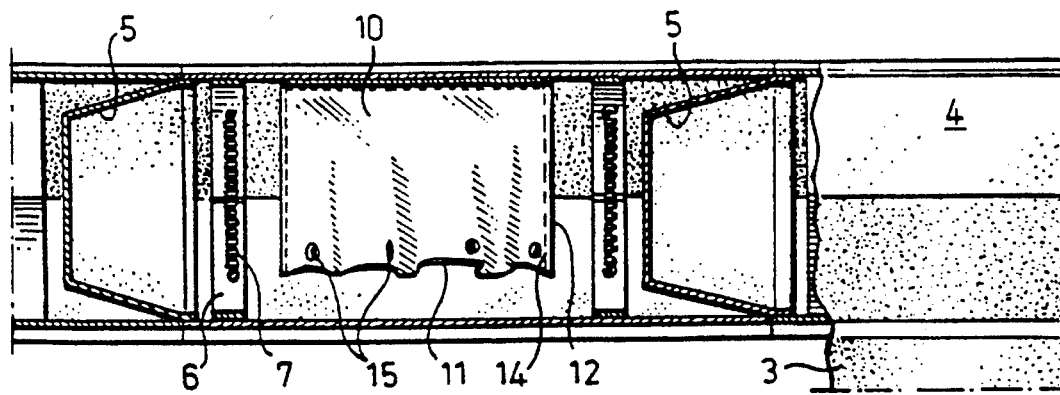
FIG. 2 is a longitudinal section through the same boom along the line 2—2 in FIG. 1.

FIG. 3 similarly shows the boom in perspective in the flattened transport position, partially sectioned, and without the shield part;

FIG. 4 is a cross-section through the boom in accordance with FIG. 1 along the line 4—4 in FIG. 1;

FIG. 5 shows in the plane state a flattened piece of material intended to be attached by welding to the inside of the material of the casing in order to form a couple of air pockets.

Detailed mention will be made here only of those elements of the design which have to do with the present invention. The same is true of the drawings, in which only the details necessary for the understanding of the invention have been included.

The boom 1 consists of two main components; these are the supporting part 2 and the shield part 3. The latter is attached to the supporting part at its lower edge by appropriate fixing means. The shield part can also be securely welded to the supporting part.

The supporting part 2 is formed by a casing 4 consisting of reinforced plastic material which is welded together in a watertight fashion. Arranged at a certain distance in relation to one another inside the casing 4 are dividing walls or bulkheads 5 made of a similar material, which exhibit the form of a funnel with the casing in its flat position, but which form a conical dividing wall in its unfolded position.

The dividing walls or bulkheads 5 divide the boom 1 into a number of mutually separate sections.

Inside the casing 4 there is also a number of expansion
Inside the casing 4 there is also a number of expansion devices 6 equipped with tensionable springs 7 so arranged, when external pressure which attempts to keep the casing flattened ceases, as to fold themselves out into the position shown in FIG. 1 and, in so doing, thanks to the vacuum which then occurs inside the casing, as to cause air to be sucked in through the air valves designated by 8.

Pocket-like emergency buoyancy arrangements are arranged in accordance with the invention inside the boom casing. These consist of impervious woven or film material parts attached in such a way to the material forming the casing that a number of downwardly open pockets 9 occur with the boom in its unfolded position. Emergency buoyancy arrangements may conveniently be provided within each section bounded by dividing walls 5.

The pockets 9 formed by the impervious woven or film material are arranged opposite one another in pairs on the inside of the boom and are produced in that, for each intended pair, a double trapezoidal piece of material 10 with parallel end edges 11 and side edges 12 exhibiting a 'V'-shaped incision is attached to the inside of the casing material of the boom, in conjunction with which the narrowest part 13 at the centre of the piece 10 is attached along the strip which forms the highest point of the boom, and the side edges 12 along the incisions on either side are attached along mutually parallel strips 14 situated essentially at a right angle to the strip at the top or in the longitudinal direction of the boom, and at a mutual distance essentially corresponding to the length of the narrowest part 13. The two end edges 11 of the piece of material, which are parallel from the start, are free. By welding each of the angled sides 12, which define the 'V'-shaped recess in the piece of material before assembly, securely to its own one of the two parallel strips 14, the end parts of the free edges 11 will be fixed relative to another which is essentially shorter than the length of each edge in its straightened-out condition. This results in the material between the strips 14, depending on whether the boom in a rolled-up or unfolded state, either being folded up or forming a downwardly open pocket.

On the end edges 11 are fasteners 15 for connecting tapes of similar 16, which hold together the free end edges of each of the pieces of material attached along the inside of the boom, the task of which connecting tapes is to ensure, when the boom is unfolded, that the free edges 11 are caused to move away from the inside of the casing 4 of the boom so that air is able to enter between the piece of material 10 and the casing in order to form the desired air-filed pocket. The pockets, which are arranged in pairs, extend in the embodiment shown here downwards at an angle from the upper edge of the boom and past the central part thereof and terminate at a certain distance from the bottom part.

If a boom arranged in accordance with the invention is involved in a collision or suffers other damage such that the casing 4 is torn apart, water will enter the casing and displace the air. In a conventional boom, the damaged and water-filled section would sink and drag down adjacent sections,.and if several sections were to become damaged, parts of the boom or, in the worst case, the whole boom would sink. Because at least one air-filled pocket 9 will remain in a boom arranged in accordance with the invention, even in an otherwise water-filled section, sufficient buoyancy is provided to ensure that the boom remains well above the surface of the water. If the casing is torn only beyond the position of the material which forms the pocket, and if the pocket on the damaged side is also functioning, the buoyancy will be twice as great, of course.

What is achieved through the invention is the desired effect of obtaining an emergency buoyancy aid which, with the boom in its rolled-up position, in no way influences its thickness and manageability and, with the boom in its operating position, and without the need for special measures to be taken, ensures the buoyancy of even a partially torn boom.

The invention may, of course, be varied depending on the form and the structural design of the boom without departing from the invention as it is described in the following Patent Claims.

I claim:

1. A buoyant boom comprising:

an elongate tubular casing having an inside wall, the tubular casing being movable between a collapsed rest position and an expanded operational position, the tubular casing having an upper portion and a lower portion;

a plurality of spaced dividing walls disposed within the tubular casing, the dividing walls being made of a flexible material;

an elongate shield part attached to the tubular casing;

expansion devices attached to the tubular casing, the expansion devices being movable between a folded position and an unfolded position;

biasing members attached to the expansion devices, the biasing members urging the expansion devices into the unfolded position so that the tubular casing is moved into the expanded operational position;

a valve operatively attached to the upper portion of the tubular casing so that air enters the tubular casing through the valve when the tubular casing is moved from the collapsed rest position to the expanded operational position and air exits the tubular casing through the valve when the tubular casing is collapsed by urging the biasing members into the folded position, the tubular casing being made of a flexible material so that the casing is coilable when in the collapsed rest position;

an impervious flexible sheet material disposed inside the tubular casing, the sheet material having an upper portion and open bottom end portions, the upper portion and the bottom end portions having opposite side edges, the side edges of the upper portion being sealingly attached to the inside wall of the tubular casing so that the open bottom end portions hang from the inside wall of the tubular casing when the tubular casing is in the expanded position; and a chamber defined between the bottom end portions and the inside wall of the tubular casing, the chamber being open downwardly so that air fills the chamber between the tubular casing and the bottom end portions of the sheet material when the tubular casing is moved into the expanded position to provide buoyancy of the boom.

2. A boom according to claim 1 wherein the bottom end portions and the inside walls define two chambers disposed on each side of the longitudinal axis of the elongate tubular casing, the flexible sheet material is made of a continuous material, the flexible sheet material is foldable at the upper portion thereof and the upper portion has a length that is less than a length of the bottom end portions so that the side edges of the flexible sheet material are V-shaped when the sheet material is unfolded, the tubular casing has an uppermost portion at the inside wall, the upper portion of the sheet material is sealingly attached to the uppermost portion of the inside wall of the tubular casing, the inside wall of the tubular casing has a plurality of axially spaced apart strips that are perpendicular to the longitudinal axis of the tubular casing, the strips are spaced apart a distance from another that is less than the length of the bottom portions, the side edges of the upper portion are attached to the tubular casing at the strips so that the bottom portions of the flexible sheet material are flaccid.

3. A boom according to claim 2, wherein the flexible sheet material is made of a soft woven material and is imperviously attached to the inside wall of the tubular casing.

4. A boom according to claim 1, wherein the bottom portions of the sheet material has lower edges that are connected by connectors so that the bottom portions are remote from the inside wall of the tubular casing to provide an opening into the chamber defined between the sheet material and inside wall of the tubular casing.

* * * * *